United States Patent
Samardzija et al.

(10) Patent No.: US 12,316,390 B2
(45) Date of Patent: May 27, 2025

(54) SYSTEMS AND METHODS FOR SELECTING REFERENCE UNITS FOR CALIBRATION OF OTA TESTING STATIONS

(71) Applicant: PLUME DESIGN, INC., Palo Alto, CA (US)

(72) Inventors: Miroslav Samardzija, Mountain View, CA (US); Tommy Chu, Hsinchu County (TW); Liem Hieu Dinh Vo, San Jose, CA (US)

(73) Assignee: PLUME DESIGN, INC., Palo Alto, CA (US)

( * ) Notice: Subject to any disclaimer, the term of this patent is extended or adjusted under 35 U.S.C. 154(b) by 260 days.

(21) Appl. No.: 18/183,241

(22) Filed: Mar. 14, 2023

(65) Prior Publication Data

US 2024/0313867 A1 Sep. 19, 2024

(51) Int. Cl.
*H04B 17/00* (2015.01)
*H04B 17/18* (2015.01)
*H04B 17/29* (2015.01)

(52) U.S. Cl.
CPC ......... *H04B 17/0085* (2013.01); *H04B 17/18* (2015.01); *H04B 17/29* (2015.01)

(58) Field of Classification Search
CPC ..... H04B 17/0085; H04B 17/18; H04B 17/29
See application file for complete search history.

(56) References Cited

U.S. PATENT DOCUMENTS

| | | | |
|---|---|---|---|
| 9,768,893 B1 * | 9/2017 | Wank | H04B 17/0085 |
| 10,608,913 B2 * | 3/2020 | Lee | H04L 43/16 |
| 2008/0072050 A1 * | 3/2008 | Klonover | H04L 63/029 |
| | | | 713/176 |
| 2012/0106382 A1 * | 5/2012 | Wu | H04B 17/21 |
| | | | 370/252 |
| 2012/0309323 A1 * | 12/2012 | Guo | H04B 17/0087 |
| | | | 455/67.14 |
| 2013/0033279 A1 * | 2/2013 | Sozanski | G01R 29/0821 |
| | | | 324/750.27 |
| 2019/0004102 A1 * | 1/2019 | Gienger | H01Q 3/247 |
| 2019/0081822 A1 * | 3/2019 | Simpson | G01R 27/32 |
| 2020/0244377 A1 * | 7/2020 | Maruo | H04B 5/20 |
| 2021/0194606 A1 * | 6/2021 | Jones | H04B 17/29 |
| 2021/0247431 A1 * | 8/2021 | Maruo | G01R 29/0871 |
| 2021/0382801 A1 * | 12/2021 | Xi | G06N 20/00 |
| 2022/0253375 A1 * | 8/2022 | Rivoir | G06F 11/3684 |
| 2023/0058324 A1 * | 2/2023 | Yellapantula | H04B 7/08 |

(Continued)

*Primary Examiner* — Dominic E Rego
(74) *Attorney, Agent, or Firm* — Nicholas Martin; Greenberg Traurig, LLP (57) ABSTRACT

System and methods are provided for selecting reference units for calibration of OTA testing stations. Various embodiments include selecting a reference unit for over-the-air (OTA) testing, the selecting including responsive to conducting one or more tests for a plurality of test items on a plurality of units via an OTA testing station, collecting test result values for each of the plurality of test items; calculating a sum of all errors for each of the units, wherein the errors represent a deviation from an average result for each of the test items; determining a unit which exhibits a lowest sum value of all of the errors, wherein the unit is determined as a reference unit for calibrating the OTA testing station; and testing a wireless device with the reference unit.

20 Claims, 6 Drawing Sheets

(56) References Cited

U.S. PATENT DOCUMENTS

| | | | |
|---|---|---|---|
| 2023/0254055 A1* | 8/2023 | Ikebe | H04B 17/29 |
| | | | 455/67.12 |
| 2023/0296693 A1* | 9/2023 | Deivasigamani | F24H 15/104 |
| | | | 702/183 |
| 2023/0408566 A1* | 12/2023 | Spirito | G01R 29/105 |

* cited by examiner

SYSTEMS AND METHODS FOR SELECTING REFERENCE UNITS FOR CALIBRATION OF OTA TESTING STATIONS

FIELD OF THE DISCLOSURE

The present disclosure generally relates to networking systems and methods. More particularly, the present disclosure relates to systems and methods for selecting reference units for calibration of Over-The-Air (OTA) testing stations.

BACKGROUND OF THE DISCLOSURE

In mass production of consumer electronics such as wireless devices, it is important to test the performance of each device before delivering them to customers. For testing wireless devices adapted to communicate via different communication technologies, OTA testing is a crucial step in the production process. In mass production, this means that millions of units are tested for OTA performance.

BRIEF SUMMARY OF THE DISCLOSURE

OTA testing can be used to predict the performance and reliability of a wireless device in the real world. A device under test is placed in a free space environment, such as inside a test chamber, where real-life situations are simulated. In OTA testing, a device is subjected to different test conditions to check how the device responds in various situations. Note, as described herein, the terms device, device under test, unit, wireless device, etc. are all used interchangeably. When testing units for performance over only one test item (i.e., 2.4 GHz Ch6), selecting a reference unit for calibrating OTA testing stations is straightforward. Although, wireless devices are becoming more capable of communicating over a wide variety of communication technologies. As described herein, technologies can refer to protocols, such as, e.g., Bluetooth, Wi-Fi, Cellular, Ultra-Wide Band, Matter, ZigBee, Near-Field Communication, and millimeter waves technologies. These protocols can include multiple channels, at different frequencies, and a wireless device may include multiple antennas for the different protocols. For devices that communicate over many channels and many communication technologies, OTA testing includes a different test chamber for each technology, which is inefficient and cumbersome Accordingly, the present disclosure relates to systems and methods for selecting reference units for calibration of OTA testing stations. In some embodiments, a method includes steps of selecting a reference unit for Over-The-Air (OTA) testing, the selecting including, responsive to conducting one or more tests for a plurality of test items on a plurality of units via an OTA testing station, collecting test result values for each of the plurality of test items; calculating a sum of all errors for each of the units, wherein the errors represent a deviation from an average result for each of the test items; determining a unit which exhibits a lowest sum value of all of the errors, wherein the unit is determined as a reference unit for calibrating the OTA testing station; and testing a wireless device with the reference unit.

The steps can further include calculating a modification weight based on a plurality of factors, wherein the modification weight is utilized to modify the sum value. The plurality of factors can include a correlation between OTA testing station results and anechoic chamber test results. The plurality of factors can include a plurality of normalization factors. The plurality of factors can include a guard factor, wherein the guard factor is determined based on a value of a process capability index. The process capability index represents a relationship between a range of test result values for a specific test item and an upper and lower limit. Responsive to the test result values of a test item having a high process capability index, the steps further include ignoring the test item when calculating the sum of all errors. The plurality of test items can include specific channels of certain bands of different communication technologies, and wherein each of the test items are tested for each of the plurality of units. The one or more tests include testing performance of any of transmit power and receive power for each of the test items. The communication technologies can include any of Bluetooth, Wi-Fi, Cellular, Ultra-Wide Band, Matter, ZigBee, Near-Field Communication, and millimeter waves technologies. The steps can be repeated for identifying any number of units as reference units.

BRIEF DESCRIPTION OF THE DRAWINGS

The present disclosure is illustrated and described herein with reference to the various drawings, in which like reference numbers are used to denote like system components/method steps, as appropriate.

DETAILED DESCRIPTION OF THE DISCLOSURE

The present disclosure relates to systems and methods for selecting reference units for calibration of OTA testing stations. Wireless devices have become more capable of communicating over a wide variety of communication technologies. Such communication technologies include Bluetooth, Wi-Fi, Cellular, Ultra-Wide Band, Matter, ZigBee, Near-Field Communication, and millimeter waves technologies. Each of these technologies also includes many bands and channels for sending and receiving signals. Each of these channels becomes a required test item in the testing phase of production. The present disclosure avoids multiple test chambers, one for each communication technology, in favor of a single test chamber having an antenna calibrated with a so-called "reference unit." The reference unit a wireless device that exhibits the most balanced performance across all of the population. That is, the wireless device can be referred to as a "golden unit" or "golden device" (used interchangeably), which are ideal examples of the wireless device, i.e., ideal examples against which all later devices are tested and judged. The term "golden" is used to describe the precision of the device to standard specifications.

Selecting a reference unit for devices that communicate over these many channels and many communication technologies has becomes difficult due to the need to verify performance for each of the test items. Present systems and methods provide solutions for selecting one or more reference units for testing devices capable of such diverse communication. By selecting a golden unit, a test chamber can be calibrated thereto such that there is only a need to test each unit in production in the single test chamber, for all of the given communication technologies supported. In a device that supports several communication technologies, e.g., at least five, this significantly reduces the testing time after manufacturing. There is no need to move a device under test between five or more test chambers.

Access Point

Figure 1:
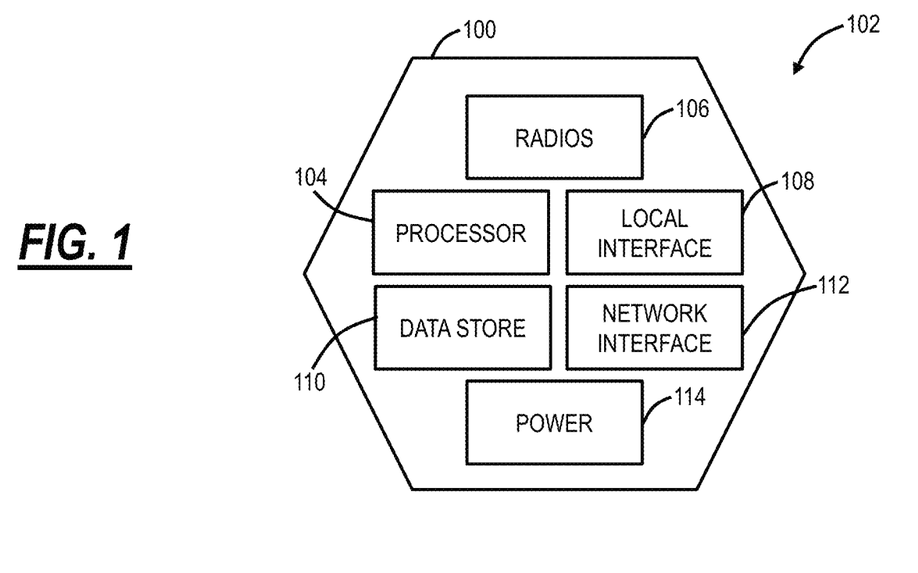
FIG. 1 is a block diagram of functional components of an access point for use in a distributed Wi-Fi system according to some embodiments of the present disclosure.

FIG. 1 is a block diagram of functional components of an access point 102 (also referred to as a wireless router, wireless device, multi-function wireless device, unit, etc.) which can be used in a distributed Wi-Fi system. The access point 102 includes a physical form factor 100 which contains a processor 104, one or more radios 106, a local interface 108, a data store 110, a network interface 112, and power 114. It should be appreciated by those of ordinary skill in the art that FIG. 1 depicts the access point 102 in an oversimplified manner, and a practical embodiment may include additional components and suitably configured processing logic to support features described herein or known or conventional operating features that are not described in detail herein. In some embodiments, the form factor 100 is a compact physical implementation where the access point 102 directly plugs into an electrical socket and is physically supported by the electrical plug connected to the electrical socket. This compact physical implementation is ideal for a large number of access points 102 distributed throughout a residence. Of note, the form factor 100 can be compact such that there is little room for large heatsinks or fans. The systems and methods described herein provide systems and methods for testing wireless devices such as the access point 102.

The processor 104 is a hardware device for executing software instructions. The processor 104 can be any custom made or commercially available processor, a central processing unit (CPU), an auxiliary processor among several processors associated with a mobile device, a semiconductor-based microprocessor (in the form of a microchip or chip set), or generally any device for executing software instructions. When the access point 102 is in operation, the processor 104 is configured to execute software stored within memory or the data store 110, to communicate data to and from the memory or the data store 110, and to generally control operations of the access point 102 pursuant to the software instructions. In some embodiments, the processor 104 may include a mobile-optimized processor such as optimized for power consumption and mobile applications.

The radios 106 enable wireless communication in the distributed Wi-Fi system. The radios 106 can operate according to the IEEE 802.11 standard. The radios 106 include address, control, and/or data connections to enable appropriate communications on the distributed Wi-Fi system. As described herein, the access point 102 includes one or more radios to support different links, i.e., backhaul links and client links. The optimization determines the configuration of the radios 106 such as bandwidth, channels, topology, etc. In some embodiments, the access points 102 support dual-band operation simultaneously operating 2.4 GHz (2.4G) and 5 GHZ (5G) 2×2 Multiple Input, Multiple Output (MIMO) 802.11b/g/n/ac/ax radios capable of operating at 2.4 GHz, 5 GHZ, and 6 GHz. Additionally, the access point 102 can be adapted to operate (i.e., send and receive signals) over Bluetooth (BT), Wi-Fi, Cellular (Long-Term Evolution (LTE), 5G, etc.), Ultra-Wide Band (UWB), Matter, ZigBee, Near-Field Communication (NFC), millimeter waves technologies (60 GHz radar), and others of the like. The access point can further include antennas supporting a plurality of protocols at a plurality of frequencies for wireless communication.

The local interface 108 is configured for local communication to the access point 102 and can be either a wired connection or wireless connection such as Bluetooth or the like. Since the access points 102 are configured via the cloud, an onboarding process is required to first establish connectivity for a newly turned on access point 102. In some embodiments, the access points 102 can also include the local interface 108 allowing connectivity to the user device (or a Wi-Fi client device) for onboarding to the distributed Wi-Fi system such as through an app on the user device. The data store 110 is used to store data. The data store 110 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 110 may incorporate electronic, magnetic, optical, and/or other types of storage media.

The network interface 112 provides wired connectivity to the access point 102. The network interface 112 may be used to enable the access point 102 communicate to a modem/router. Also, the network interface 112 can be used to provide local connectivity to a Wi-Fi client device or user device. For example, wiring in a device to an access point 102 can provide network access to a device which does not support Wi-Fi. In some embodiments, all of the access points 102 in the distributed Wi-Fi system 10 include the network interface 112. In another embodiment, select access points 102 which connect to the modem/router 18 or require local wired connections have the network interface 112. The network interface 112 may include, for example, an Ethernet card or adapter (e.g., 10BaseT, Fast Ethernet, Gigabit Ethernet, 10 GbE). The network interface 112 may include address, control, and/or data connections to enable appropriate communications on the network.

The processor 104 and the data store 110 can include software and/or firmware which essentially controls the operation of the access point 102, data gathering and measurement control, data management, memory management, and communication and control interfaces with the server 20 via the cloud. The processor 104 and the data store 110 may be configured to implement the various processes, algorithms, methods, techniques, etc. described herein.

OTA Testing

OTA testing is a method for analyzing wireless performance and reliability of devices, such as the access point described herein. This method of testing is adapted to examine the performance of wireless devices having embedded antennas. OTA testing is a critical step in the manufacturing process of wireless devices, where various components of a wireless device can be manufactured by third-party suppliers. It is essential to test the performance of assembled wireless devices in order to verify operation and identify any faulty components for timely remediation. Accordingly, as discussed herein, the disclosed calibration and implementation can enable a more efficient operation, which can reduce resource drain and expenditure, while evidencing a more accurate execution of the system as a whole. Indeed, properly calibrated devices can effectuate improved interactions within existing operating environments, both with respect to other users and/or other devices.

Figure 2:
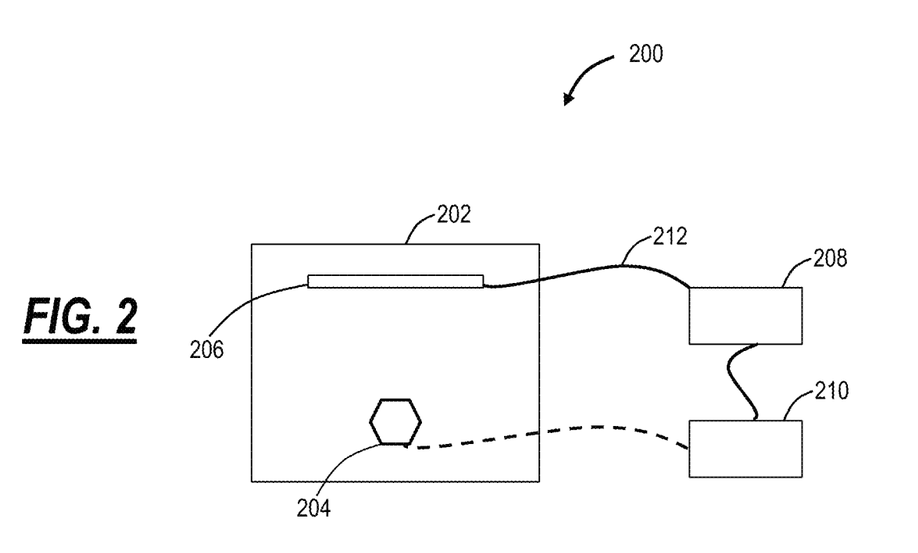
FIG. 2 is a diagram of an OTA testing station with accompanying components according to some embodiments of the present disclosure.

FIG. 2 is a diagram of an OTA testing station 200 with accompanying components. To perform an OTA test, a Device Under Test (DUT) 204 is placed in a test chamber 202. It will be appreciated that the DUT 204 can be the access point 102 of the present disclosure or any other wireless device having embedded antennas for data transfer. The test chamber 202 is designed in such a way as to isolate the interior from any outside signals. The OTA test can additionally require reference antennas 206, a base station 208, and computer equipment 210. The various components can be communicatively coupled via coaxial cables 212 for data transfer. The base station 208 can be a call box such as R&S/Anritsu/Agilent Emulators, or a reference DUT. The reference antenna 206 inside of the test chamber 202 is coupled to the base station 208 via coaxial cable 212. The base station 208 is coupled to the computing equipment 210 via ethernet or Universal Serial Bus (USB) cable. The computing equipment 210 can be a computer for hosting the testing program that allows the DUT 204 to connect to the base station 208, and for the testing to be conducted. The computing equipment 210 is adapted to hosts a test program that controls the base station 208 by telling it to allow connection to the DUT 204. The base station 208 can then retrieve the measurements (i.e., Transmit Powers, Error Vector Magnitude, etc.).

When producing devices such as the access point 102, many components are assembled during manufacturing. These components can be supplied by various third-party sources, making it crucial to test the final product before shipping to customers. These devices can be tested in different situations depending on the device capabilities. For example, a device capable of communicating via a variety of technologies must have each of these forms of communication tested and verified before shipping. These forms of communication can include BT, Wi-Fi, Cellular, UWB, Matter, ZigBee, NFC, millimeter waves technologies, etc. Each of these technologies further includes many bands and many channels over which the communication can be established. Each of these channels becomes a test item which must be verified during the testing phase of production. In mass production of such customer electronics (wireless devices), production facilities can produce millions of units which must be tested for OTA performance. By doing so, production facilities can guarantee that each unit has been manufactured, assembled, and is functioning as intended.

OTA testing can measure the sensitivity and radiated transmission power of a wireless device. Poor performance in these metrics can lead to poor user experience for the customer, making OTA testing an important step in the manufacturing process of wireless devices. In typical OTA testing, test plans include determining which systems need to be measured, what bands need to be measured, what kinds of situations the DUT is planned to be used in, and determining if any additional control software is required.

Figure 3:
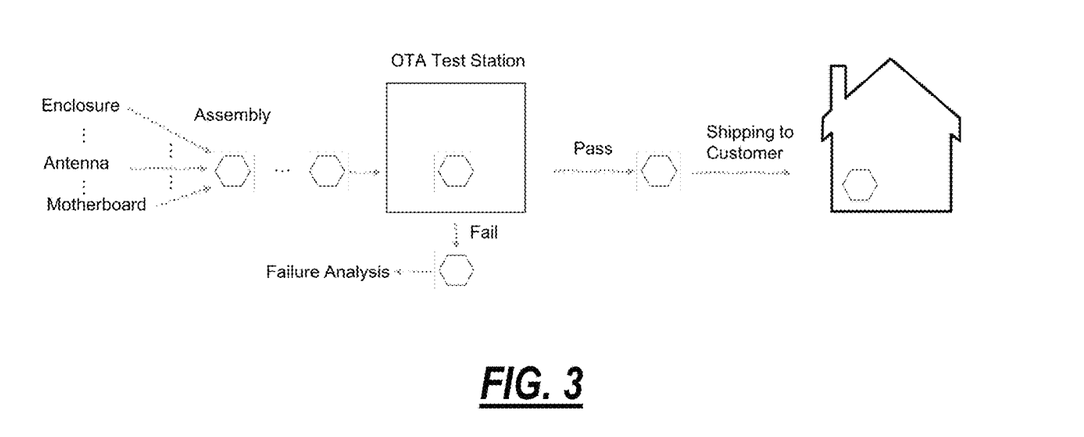
FIG. 3 is a flow diagram of wireless device production and testing according to some embodiments of the present disclosure.

FIG. 3 is a flow diagram of wireless device production and testing. As described previously, the production of wireless devices may include components provided by various third-party suppliers. Once all components are assembled, testing can commence. Based on the results of the testing, the devices can either be passed and marked as ready to ship, or sent for failure analysis if the testing results in a failed unit.

Figure 4:
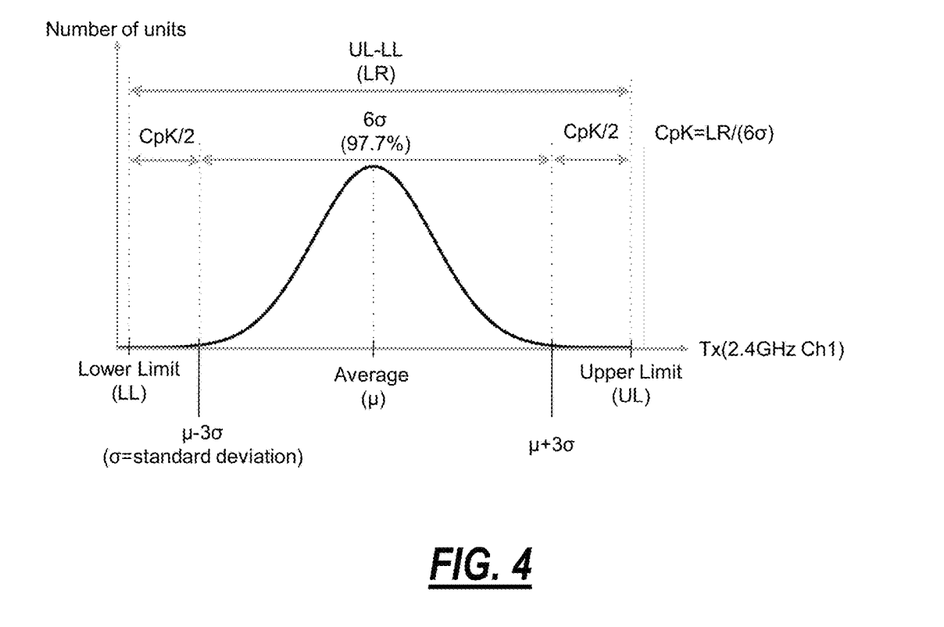
FIG. 4 is a gaussian distribution of OTA test results according to some embodiments of the present disclosure.

Typically, when a large number of units are tested, a gaussian (bell curve) distribution of test results is expected. FIG. 4 is a gaussian distribution of OTA test results. The y-axis of the curve represents the number of units, while the x-axis of the curve represents the tested test item, such as transmit power over 2.4 GHz Channel 1. As represented by the distribution, most of the tested units, i.e., DUTs, receive a result close to the average of the curve. The average of the curve being the point represented by the highest number of units. As testing is continued, some units will receive results which fall below or above the average. A process capability index (CpK) can be calculated, the CpK represents the range of the distribution relative to an upper and lower limit. For example, if CpK=1, then there is no buffer between the Limit Range (LR) and the distribution width. LR can be determined based on difference of the upper limit (UL) and lower limit (LL). A CpK of 1.33 is typically accepted as an industry standard. CpK can be calculated as follows:

$$C_PK = \frac{LR}{6\sigma}, \quad \text{Eq. 1}$$

$\sigma$ being the standard deviation of the distribution, and where $6\sigma$ is the total range of the distribution.

Typically, a unit (wireless device) that performs exactly or close to the average is selected to calibrate pathloss in all of the OTA test chambers. The selected unit is further referred to as a reference unit. All further unit tests are compared/tested against the selected reference unit.

When the units being tested are only tested based on one test item, i.e., 2.4 GHz Ch6, then the testing can commence as stated previously. Although, as described herein, wireless devices can be capable of wireless communication over a variety of technologies. Again, these technologies can include BT, Wi-Fi, Cellular, UWB, Matter, ZigBee, NFC, millimeter waves technologies, etc. It is important to test all of the capabilities of these wireless devices, thus requiring multiple test items to be tested on each unit. Because of this, selecting one or more reference units is not trivial when a plurality of test items (channels) and many different technologies are present, and in need of testing. It will be appreciated that the term "test items" can refer to any metric being tested on a wireless device, these metrics can include transmit power, receive power, etc. for various channels of different communication technologies.

Figure 5:
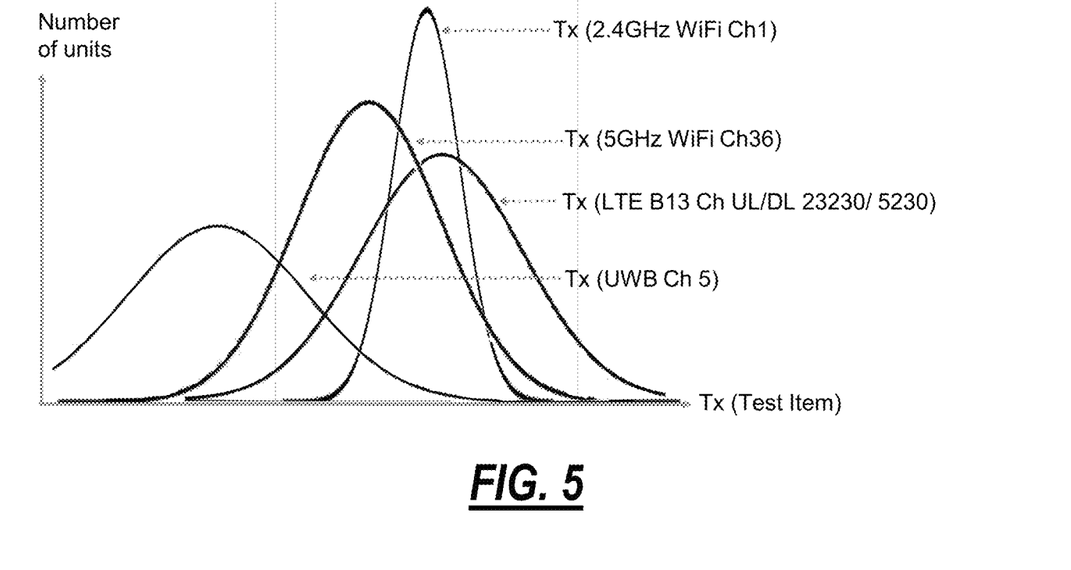
FIG. 5 is a collection of various test distributions associated with OTA testing according to some embodiments of the present disclosure.

FIG. 5 is a collection of various test distributions associated with OTA testing. As described previously, wireless devices which are capable of communicating over multiple technologies require multiple test items to be analyzed. This is represented by the plurality of test distributions, where each of the test distributions represents a collection of results from a single test item. The test items represented in FIG. 5 include transmit power over 2.4 GHz Wi-Fi Ch1, 5 GHz Wi-Fi Ch36, LTE B13 Ch UL/DL 23230/5230, and UWB Ch 5. It will be appreciated that the distributions/test items represented in the present figure are non-limiting examples, and various embodiments of the present disclosure contemplate any test item related to wireless devices. Also, the values of LL, UL, μ, and σ can be different for each of the distributions. Where u represents the average and o represents a standard deviation.

Typically, a DUT has many technologies with each of the technologies having multiple bands and channels. Because of this, it is difficult to find a reference unit that has performance which is exactly the average for all of the channels. The present disclosure provides systems and methods for determining a reference unit to use in OTA testing when multiple technologies with a plurality of channels are involved.

Selection of Reference Units for Calibration of OTA Testing Stations

As discussed herein, a unit (wireless device) that performs exactly or close to the average of a specific test item can be selected to calibrate pathloss in all of the OTA test chambers which will be used for further testing. The selected unit or units are further referred to as a reference units. All further unit tests are compared/tested against the selected reference unit. When the units are capable of communicating over multiple technologies with multiple channels, this process of selecting reference units can be challenging. The present methods provide a solution for selecting references units that exhibit such capabilities.

In various embodiments, a selection of units (e.g., in a range of 50-100 units, for example) are run through a single OTA test station. The test result values are collected for all test items, the test item results including performance over channels in all bands across all communication technologies. Again, this results in many distributions of test results based on the number of test items. A Modified Least Mean Square (MLMS) is calculated according to the formula below.

$$MLMS = \sqrt{\sum_{i=0}^{N}\left[(T^i - \mu^i)w^i\right]^2}, \quad \text{Eq. 2}$$

Eq. 2 represents a method for selecting an appropriate reference unit, or multiple reference units. In simplified terms, Eq. 2 provides a sum of all errors corresponding to a specific unit. The MLMS value can further be referred to as a sum value. The errors represent how far off a unit is from the average for each of the test items, i.e., after testing a unit on a specific test item, the error is the difference between the unit test item result and the average result for that test item. Thus, the MLMS provides the sum of all errors with respect to each of the test items. By using the present method, the reference unit will be chose as the unit which has the least deviation from the mean across all channels.

In Eq. 2, $T^i$ represents the measured value (for a specific test item) of a specific channel (where i represents the specific channel under test). $\mu^i$ represents the average tested value for that specific test item and channel. Thus, $(T^i - \mu^i)$ provides the difference between the tested unit and the average. Because some distributions, i.e., test items, are more critical than others, a weighting function $w^i$ is utilized. The difference is multiplied by this weighting function in order to provide a more useful result.

Figure 6:
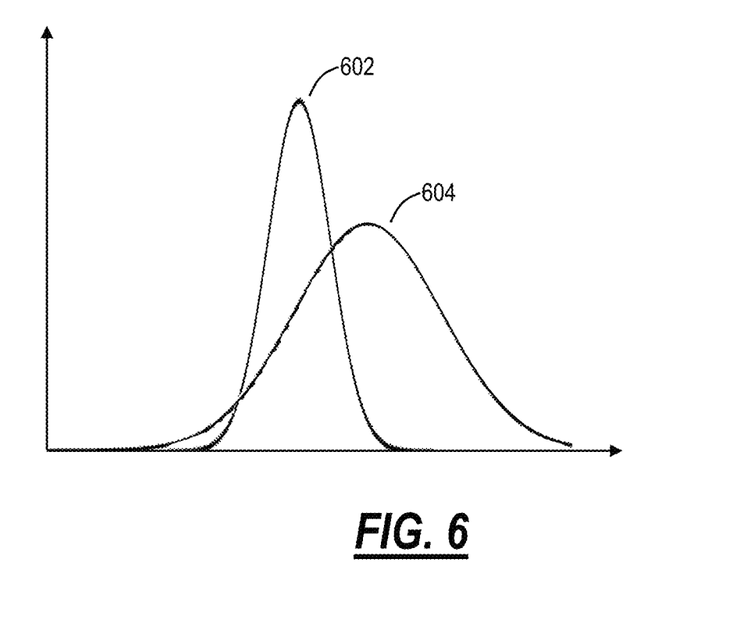
FIG. 6 is a diagram showing results of test items with different types of distributions according to some embodiments of the present disclosure.

In some embodiments, less weight is given to test items which have a tighter distribution. FIG. 6 is a diagram showing results of test items with different types of distributions. The graph shows a tighter distribution 602 and a more spread out distribution 604. The weight w is calculated based on these characteristics. In other words, with a more spread out distribution 604, there is a higher chance of a unit testing outside of the predefined limits, making these curves more important and requiring more weight w. The modification weight w, for a specific channel i ($w^i$) is calculated as follows.

$$w^i = g^i \cdot c^i \cdot \frac{\sigma^i}{UL_i - LL^i} \cdot \frac{1}{\sum_{m=1}^{M^i} m} \cdot \frac{1}{\sum_{b=1}^{B^i} b}, \quad \text{Eq. 3.}$$

Thus, $w^i$ is the product of multiple factors. The first of these factors is a guard factor ($g^i$). $g^i$ is calculated in order to rule out distributions which are not as important. $g^i$ is calculated as follows.

$$g^i = \begin{cases} 0, & \text{if } C_PK \geq 1.33 \\ 1, & \text{if } C_PK < 1.33 \end{cases}, \quad \text{Eq. 4.}$$

In other words, if the value of CpK for a specific curve is greater than or equal to 1.33, then the distribution is ignored, i.e., the value of $g^i$ is 0, thereby resulting in that test item having a value of 0. It will be appreciated that the values described herein are contemplated as non-limiting examples, and other limits for CpK are considered in other embodiments.

Further, a correlation (ci) is considered when calculating the modification weight $w^i$. The correlation is determined by comparing test results from the test chamber against test results from a real scenario for a specific test item. This is performed to see if the results from the test chamber represent actual results and device performance. The correlation can have a value between 1 and 0 based on this comparison, where a high correlation results in a value of 1. The correlation (ci) can be calculated as follows:

$$c^i = \frac{\sum \left(T^i_{x(OTA)} - \overline{T^i_{x(OTA)}}\right)\left(T^i_{x(chamber)} - \overline{T^i_{x(chamber)}}\right)}{\sum \left(T^i_{x(OTA)} - \overline{T^i_{x(OTA)}}\right)^2 \left(T^i_{x(chamber)} - \overline{T^i_{x(chamber)}}\right)^2}, \quad \text{Eq. 5.}$$

Figure 7:
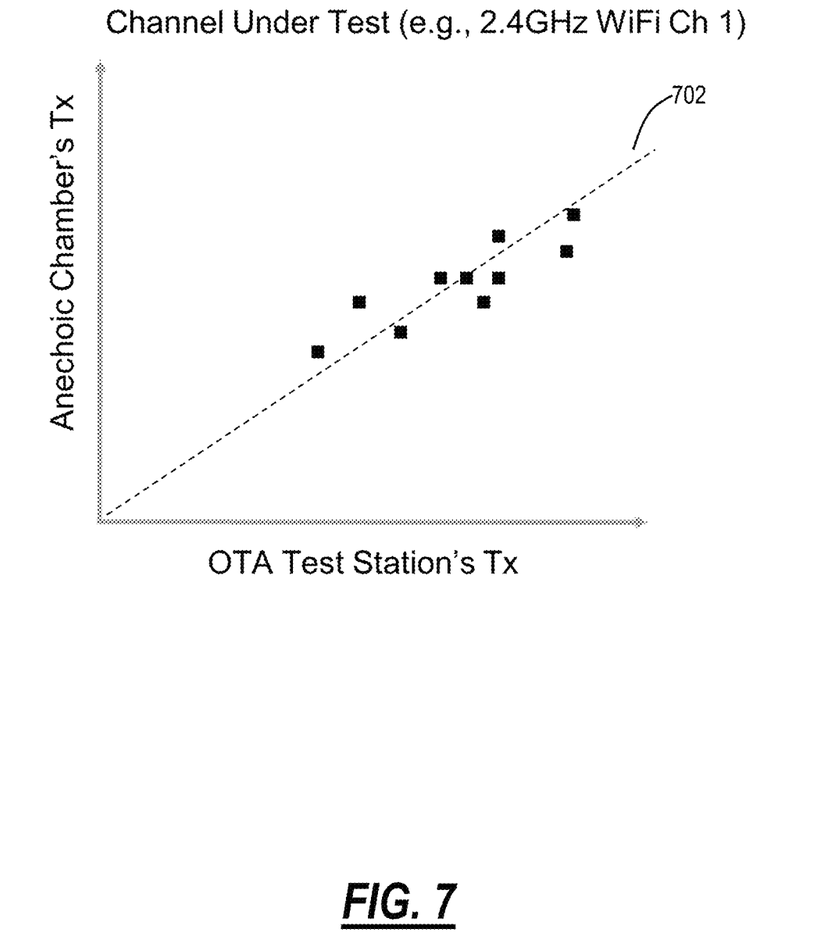
FIG. 7 is a graph comparing OTA test results and test results from an anechoic chamber for a specific test item according to some embodiments of the present disclosure.

The correlation can be a comparison between the OTA test station results and test results from an anechoic chamber. FIG. 7 is a graph comparing OTA test results and test results from an anechoic chamber for a specific test item for a plurality of units. In the graph depicted in FIG. 7, a comparison of transmit power over 2.4 GHz Wi-Fi channel 1 is shown. In this example, the test item is 2.4 GHz Wi-Fi channel 1. To produce this comparison, a plurality of units are tested in the OTA test station for performance in the test item. Additionally, these units are tested in an anechoic chamber for performance in the same test item. In order for a test item to be given a high value for $c^i$, a strong correlation must be witnessed between the two testing methods. If a low correlation is seen between the two testing methods for a specific test item, the test item is given a low value for $c^i$, thus lowering the weight and impact that the specific test item has in the total sum value.

The strength of the correlation can be determined by inspecting the resulting values each testing method produces. For example, a strong correlation can be identified if, for a specific unit, the transmit power result over a specific channel is the same or very similar. When many units are tested, the resulting points can form a line 702 having a slope of 1.

Further, for calculating the modification weight, the width of the curve over the limit range is considered. Additionally, various normalization operations are performed for normalizing the number of channels $M^i$ and the number of bands $B_i$. This is done to make sure that test items having a large number of channels and bands do not overpower other test items which have fewer channels and bands. The product of these factors produce the modification weight $w^i$ as shown in the equations above. These normalization operations can produce what is further referred to as normalization factors.

As an example, the following values are considered. The test items for this example include 1 Bluetooth channel, 3 channels in 2.4 GHz Wi-Fi, 6 channels in 5 GHz Wi-Fi band, 9 channels in 6 GHz Wi-Fi band, 2 channels in UWB band, and 1 channel from each of the 40 LTE bands. In order to calculate the summand (i.e., $[(T-\mu)w]^2$) for the channel under test of 2.4 GHz Wi-Fi channel 1, the constants of N, M, and B are as follows.

i=channel under test (2.4 GHz Wi-Fi channel 1)
$T^i$=16 (measured value of specific unit in specific test item)
$\mu^i$=18 (average measured value of all sample units for specific test item)
N=61 (the total number of tested channels)
$M^i$=3 as there are 3 channels tested in 2.4 GHz Wi-Fi band
$B^i$=3 as there are 3 bands tested in Wi-Fi technology (i.e., 2.4 GHz, 5 GHZ, and 6 GHZ)
$g^i$=1 because CpK is greater than or equal to 1.33
$c^i$=0.8 based on the correlation between OTA testing (relative) and anechoic chamber testing (absolute)

$$w^i = 1 \cdot 0.8 \cdot \frac{0.7}{21-15} \cdot \frac{1}{\sum_{m=1}^{3} m} \cdot \frac{1}{\sum_{b=1}^{3} b}, \quad \text{Eq. 8}$$

$$MLMS = \sqrt{\sum_{i=0}^{61} [(16-18)w^i]^2}, \quad \text{Eq. 9.}$$

The unit which exhibits the smallest value of MLMS (smallest sum value) is chosen to be the reference unit. In various embodiments, multiple units which exhibit relatively low MLMS can be chosen to be reference units. These units are chosen based on their testing results being relative to the center (average) of each distribution for each test item (all channels across all bands in all technologies). These steps can be repeated any number of times for any number of units in order to accumulate a desired number of reference units.

Process for Selecting Reference Units for Calibration of OTA Testing Stations

Figure 8:
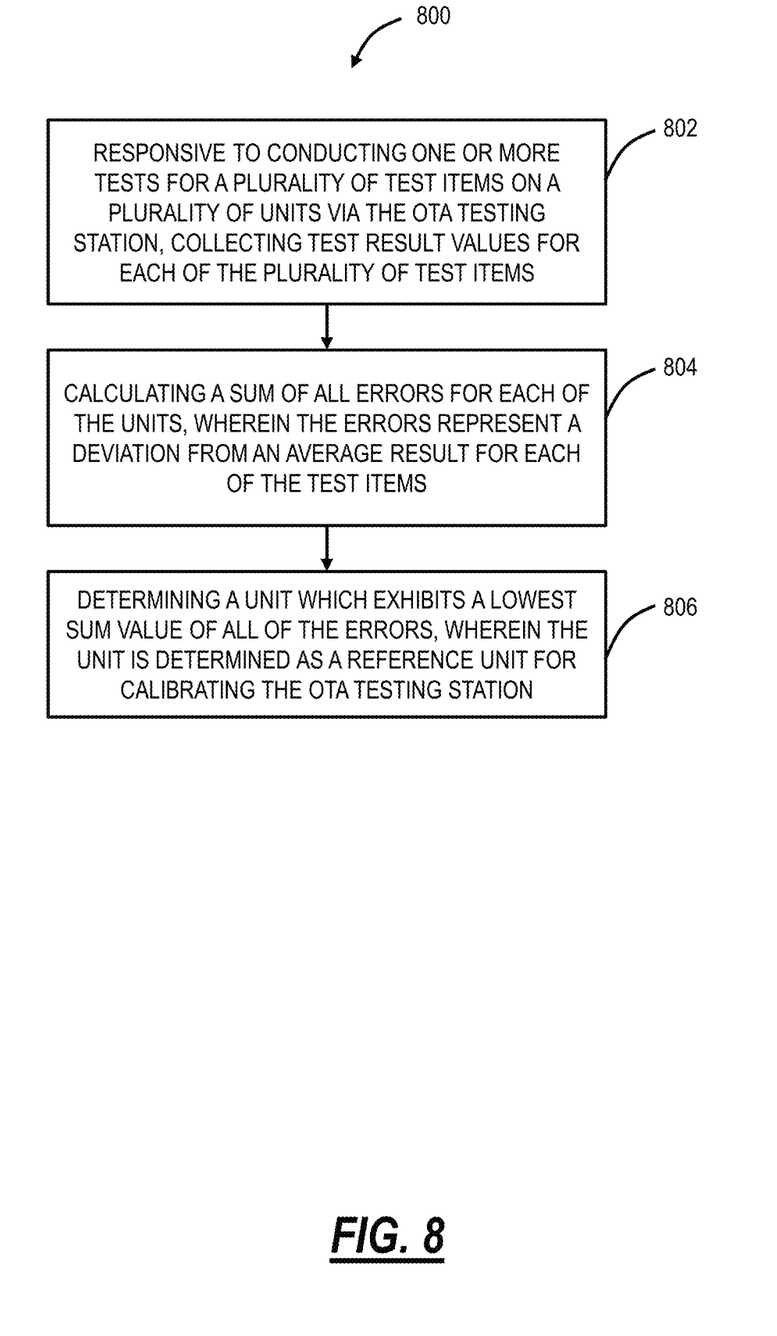
FIG. 8 is a flowchart of a process for selecting reference units for calibration of OTA testing stations according to some embodiments of the present disclosure.

FIG. 8 is a flowchart of a process 800 for selecting reference units for calibration of OTA testing stations. According to some embodiments, process 800 can begin with step 802, where test result values for each of the plurality of test items are collected. In some embodiments, such test result values can be collected in response to conducting one or more tests for a plurality of the test items on a plurality of units via the OTA testing station. In some embodiments, the testing can be performed according to a predetermined period of time or interval, which can be based on, but not limited to, a preset value, a number of test items, units, and the like, or some combination thereof.

In step 804, a sum of all errors can be calculated. In some embodiments, the test result values from step 802 can be analyzed, whereby based on such analysis, error information (or metrics) can be determined. In some embodiments, such error information can indicate a value of the errors and/or a type of error. As such, in some embodiments, the errors can be summed (or grouped, or clustered) for continued processing, as discussed herein. In some embodiments, the error information can correspond to and/or represent a determined deviation from an average result for each of the test items. Thus, in some embodiments, the test values can be analyzed, whereby based on an overall average, whether a test result correlates to an error can be based on a range of a deviation from the average for that test result.

In step 806, a further analysis can be performed which can enable a determination as to which unit exhibits a lowest sum value of all the errors. In some embodiments, such determination of the unit corresponds to the unit being a reference unit for calibrating the OTA testing station. In some embodiments, the identification of such reference unit can enable calibration and/or modification of the OTA testing station to a non-native state to enable proper and accurate calibration, as discussed herein.

Figure 9:
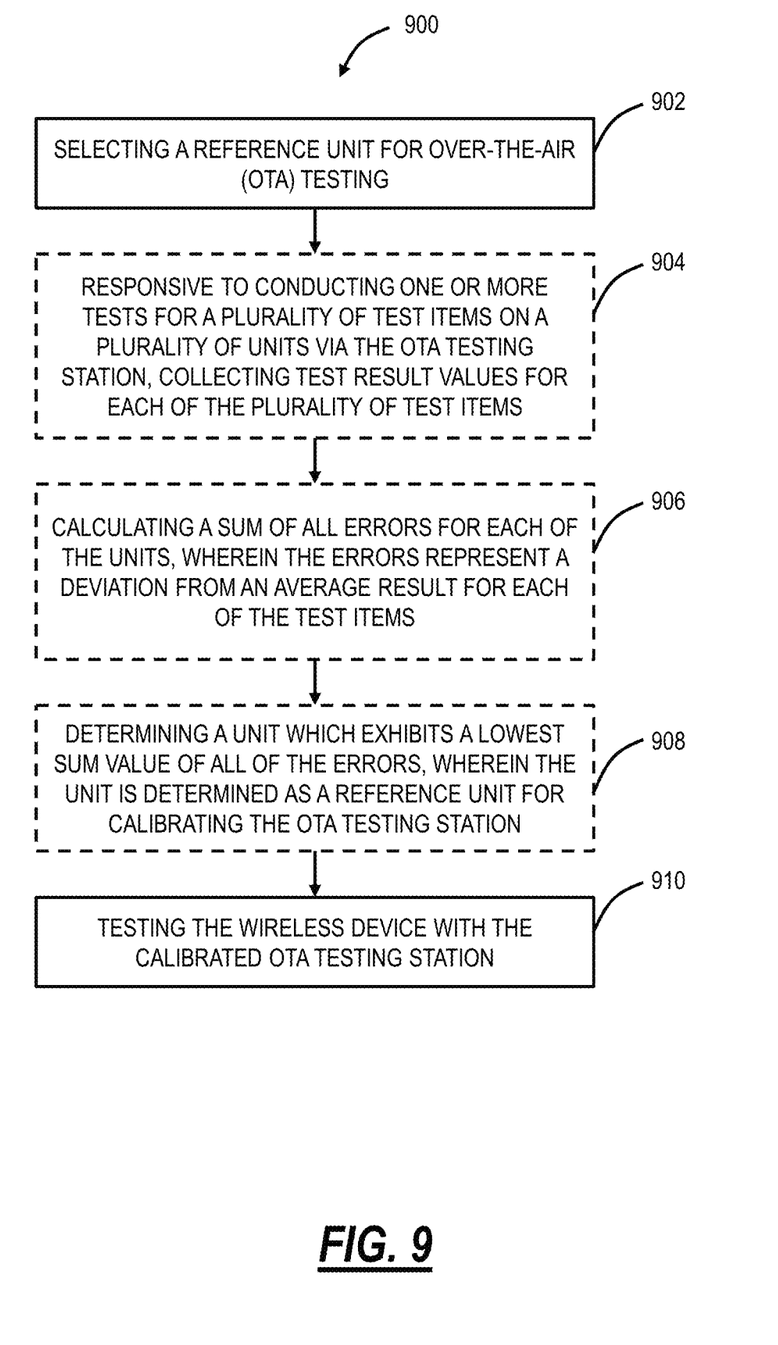
FIG. 9 is a flowchart of a process for testing a wireless device having a plurality of antennas supporting a plurality of protocols at a plurality of frequencies according to some embodiments of the present disclosure.

Turning to FIG. 9, provided is process 900 which corresponds to a workflow for testing a wireless device having a plurality of antennas supporting a plurality of protocols at a plurality of frequencies.

According to some embodiments, process 900 begins with step 902 where a reference unit for OTA testing is selected. According to some embodiments, such selection can be based on, but not limited to, conducting one or more tests for a plurality of test items on a plurality of units via an OTA testing station, as discussed above at least in relation to process 800.

In step 904, test result values for each of the plurality of test items can be collected. According to some embodiments, such test result values can be collected in a similar manner as discussed above at least in relation to step 802 of process 800, discussed supra.

In step 906, a sum of all errors for each of the units can be calculated, where the errors can represent a deviation from an average result for each of the test items. Accordingly, step 906 can be performed in a similar manner as discussed above at least in relation to step 804 of process 800, discussed supra.

In step 908, a unit which exhibits a lowest sum value of all of the errors is determined. The unit can be determined as a reference unit for calibrating the OTA testing station. Thus, step 908 can be performed in similar manner as discussed above at least in relation to step 806 of process 800, discussed supra.

And, in step 910, the wireless device can be tested with/via the calibrated OTA testing station. Such testing can enable the determination of a quality of its connectivity and/or capabilities for communication signals to/from other devices.

According to some embodiments, process 900 can further include calculating a modification weight based on a plurality of factors, wherein the modification weight is utilized to modify the sum value. In some embodiments, the plurality of factors can include, but are not limited to, a correlation between OTA testing station results and anechoic chamber test results. In some embodiments, the plurality of factors can include a plurality of normalization factors. The plurality of factors can include a guard factor, wherein the guard factor is determined based on a value of a process capability index.

In some embodiments, process capability index represents a relationship between a range of test result values for a specific test item and an upper and lower limit. Responsive to the test result values of a test item having a high process capability index, the steps further include ignoring the test item when calculating the sum of all errors. The plurality of test items can include specific channels of certain bands of different communication technologies, and wherein each of the test items are tested for each of the plurality of units. The one or more tests include testing performance of any of transmit power and receive power for each of the test items. The communication technologies can include any of Bluetooth, Wi-Fi, Cellular, Ultra-Wide Band, Matter, ZigBee, Near-Field Communication, and millimeter waves technologies. The steps can be repeated for identifying any number of units as reference units.

CONCLUSION

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:
1. A method comprising:
selecting a reference unit for Over-The-Air (OTA) testing of a wireless device, the wireless device having a plurality of antennas supporting a plurality of protocols at a plurality of frequencies;
wherein the selecting comprises:
responsive to conducting one or more tests for a plurality of test items on a plurality of units via an OTA testing station, collecting test result values for each of the plurality of test items;
calculating a sum of all errors for each of the units, wherein the errors represent a deviation from an average result for each of the test items;
determining a unit which exhibits a lowest sum value of all of the errors, wherein the unit is determined as a reference unit for calibrating the OTA testing station;
testing the wireless device with the calibrated OTA testing station;
configuring the wireless device based on the testing via the calibrated OTA testing station, the configuration enabling modification of the connectivity of the wireless device.

2. The method of claim 1, further comprising calculating a modification weight based on a plurality of factors, wherein the modification weight is utilized to modify the sum value.

3. The method of claim 2, wherein the plurality of factors includes a correlation between OTA testing station results and anechoic chamber test results.

4. The method of claim 2, wherein the plurality of factors includes a plurality of normalization factors.

5. The method of claim 2, wherein the plurality of factors includes a guard factor, and wherein the guard factor is determined based on a value of a process capability index.

6. The method of claim 5, wherein the process capability index represents a relationship between a range of test result values for a specific test item and an upper and lower limit.

7. The method of claim 5, further comprising:
ignoring the test item when calculating the sum of all errors responsive to the test result values of a test item having a high process capability index.

8. The method of claim 1, wherein the plurality of test items include specific channels of certain bands of different communication technologies, and wherein each of the test items are tested for each of the plurality of units.

9. The method of claim 8, wherein the one or more tests include testing performance of any of transmit power and receive power for each of the test items.

10. The method of claim 8, wherein the communication technologies include any of Bluetooth, Wi-Fi, Cellular, Ultra-Wide Band, Matter, ZigBee, Near-Field Communication, and millimeter waves technologies.

11. A method comprising:
conducting one or more tests for a plurality of test items on a plurality of units via an Over-The-Air (OTA) testing station;
collecting, based on the one or more tests, test result values for each of the plurality of test items;
calculating a sum of all errors for each of the units, the errors represent a deviation from an average result for each of the test items;

determining a unit which exhibits a lowest sum value of all of the errors, the unit being identified as a reference unit for calibrating the OTA testing station; and calibrating the OTA testing station based on the reference unit, the calibration enabling non-native functionality for the OTA testing station.

12. The method of claim 11, further comprising calculating a modification weight based on a plurality of factors, wherein the modification weight is utilized to modify the sum value.

13. The method of claim 11, wherein the plurality of test items include specific channels of certain bands of different communication technologies, and wherein each of the test items are tested for each of the plurality of units.

14. The method of claim 13, wherein the one or more tests include testing performance of any of transmit power and receive power for each of the test items.

15. The method of claim 13, wherein the communication technologies include any of Bluetooth, Wi-Fi, Cellular, Ultra-Wide Band, Matter, ZigBee, Near-Field Communication, and millimeter waves technologies.

16. The method of claim 11, further comprising: repeating the calibration for each number of units identified as reference units.

17. A non-transitory computer-readable storage medium having computer-readable code stored thereon for programming one or more processors to perform a method comprising:

conducting one or more tests for a plurality of test items on a plurality of units via an Over-The-Air (OTA) testing station;

collecting, based on the one or more tests, test result values for each of the plurality of test items;

calculating a sum of all errors for each of the units, the errors represent a deviation from an average result for each of the test items;

determining a unit which exhibits a lowest sum value of all of the errors, the unit being identified as a reference unit for calibrating the OTA testing station; and calibrating the OTA testing station based on the reference unit, the calibration enabling non-native functionality for the OTA testing station.

18. The non-transitory computer-readable storage medium of claim 17, further comprising calculating a modification weight based on a plurality of factors, wherein the modification weight is utilized to modify the sum value.

19. The non-transitory computer-readable storage medium of claim 17, wherein the plurality of test items include specific channels of certain bands of different communication technologies, and wherein each of the test items are tested for each of the plurality of units.

20. The non-transitory computer-readable storage medium of claim 19, wherein the communication technologies include any of Bluetooth, Wi-Fi, Cellular, Ultra-Wide Band, Matter, ZigBee, Near-Field Communication, and millimeter waves technologies.

* * * * *